United States Patent
Haage et al.

(10) Patent No.: US 6,820,344 B2
(45) Date of Patent: Nov. 23, 2004

(54) DEVICE FOR MEASURING AN OBJECT ACROSS SEVERAL AXES

(75) Inventors: Klaus Haage, Völklingen (DE); Josef Lauer, Püttlingen (DE)

(73) Assignee: KOMEG Industrielle Messtechnik GmbH, Völklingen (DE)

( * ) Notice: Subject to any disclaimer, the term of this patent is extended or adjusted under 35 U.S.C. 154(b) by 0 days.

(21) Appl. No.: 10/258,509

(22) PCT Filed: Apr. 30, 2001

(86) PCT No.: PCT/DE01/01613

§ 371 (c)(1),
(2), (4) Date: Oct. 24, 2002

(87) PCT Pub. No.: WO01/84072

PCT Pub. Date: Nov. 8, 2001

(65) Prior Publication Data

US 2003/0097761 A1 May 29, 2003

(30) Foreign Application Priority Data

May 3, 2000 (DE) ..................................... 200 07 799 U
Dec. 20, 2000 (DE) ..................................... 200 21 650 U

(51) Int. Cl.⁷ ............................................... G01B 3/00
(52) U.S. Cl. .............................. 33/436; 33/1 M; 33/430
(58) Field of Search ........................ 33/430, 436, 1 M, 33/573, 568, 432, 437

(56) References Cited

U.S. PATENT DOCUMENTS

| | | | | |
|---|---|---|---|---|
| 340,914 A | * | 4/1886 | Howson | 33/430 |
| 571,252 A | * | 11/1896 | Walkinshaw et al. | 33/436 |
| 1,615,668 A | | 1/1927 | Anderson | |
| 3,600,811 A | * | 8/1971 | Weyrauch | 33/1 M |
| 3,793,738 A | * | 2/1974 | Blakey | 33/573 |
| 4,013,280 A | * | 3/1977 | Chitayat et al. | 33/1 M |
| 4,370,811 A | * | 2/1983 | Triggs et al. | 33/1 M |
| 4,632,529 A | * | 12/1986 | Levin | 33/430 |
| 4,688,333 A | * | 8/1987 | Welch | 33/430 |
| 4,825,559 A | * | 5/1989 | Santos | 33/430 |
| 5,345,986 A | * | 9/1994 | Kieffer | 33/430 |
| 5,363,563 A | * | 11/1994 | Hunter | 33/568 |
| 5,890,524 A | * | 4/1999 | Tucker et al. | 33/430 |

FOREIGN PATENT DOCUMENTS

| | | | |
|---|---|---|---|
| DE | 39 30 463 A | 3/1991 | |
| EP | 0 836 078 A | 4/1998 | |
| FR | 2655602 A1 * | 6/1991 | 33/1 M |
| JP | 57066305 A * | 4/1982 | 33/1 M |

* cited by examiner

Primary Examiner—Christopher W. Fulton
Assistant Examiner—Travis Reis
(74) Attorney, Agent, or Firm—Henry M. Feiereisen

(57) ABSTRACT

The invention relates to a device for measuring across several axes of an object, whereby the object to be measured can be fixed to a measuring table. According to the invention, base strips are provided which are configured laterally as a half-dovetail profile and can be fixed on the measuring plane. Attachment strips, having a groove, are provided to complement the base strips and have a toothed profile on one side. Fastening screws are associated to the groove. The base strips and attachment strips are sized and arranged with respect to the measuring table in such a way that the plane of the measuring table acts as a reference plane for the underside of the attachment strips. A clamping piece, which fixes the object, is also provided. The invention is suitable for both contactless optical measuring and tactile measuring. One of the advantages of the invention is that objects to be measured can be securely and rapidly fixed to the measuring table, even if the latter is mobile.

11 Claims, 6 Drawing Sheets

DEVICE FOR MEASURING AN OBJECT ACROSS SEVERAL AXES

BACKGROUND OF THE INVENTION

The invention relates to a device for measuring an object across several axes, whereby the object to be measured can be fixed on a measuring table.

Devices of this type are known, compare e.g. the magazine "Kontrolle" [Control] 10/96, page 12 ff. and 9/97. The measuring table provided hereby is essentially an optically transparent plate which is typically movable in two directions during the measuring process. The measuring process is carried out at high speed so that the measuring table and the attached object to be measured are exposed to relative high acceleration forces. In the event, the object to be measured is secured to the measuring table in a typical manner, for example, by a kneading mass, the high acceleration forces may cause a shift of the object during measurement to thereby render the measurement useless.

Other devices are known for tactile measurement (catalog "Mitutoyo—Präzisionsmesstechnik" [precision measuring technique], $1^{st}$ ed 5/99, page A1–A14). These known coordinate measuring equipments have various clamping systems to secure a workpiece to be measured. There is an increasing desire by the consumers for such equipments that can clamp workpieces in a still more simple and rapid fashion.

The invention is based on the task to provide a device of the afore-stated type in which the object to be measured can be fixed to the measuring table rapidly and securely so as to be prevented from changing its position during the entire measuring process, even when the measuring table is moveable.

SUMMARY OF THE INVENTION

This task is attained in accordance with the present invention in a device for contactless optical measurement of an object across several axes by providing base strips which can be secured in the measuring plane and are configured laterally as a half-dovetail profile, by providing attachment strips which complement the base strips and are provided with a groove and which have a toothed profile on one side, and by associating fastening screws to the groove, wherein the base strips and the attachment strips are so sized and arranged to the measuring table that the plane of the measuring table serves as reference plane for the underside of the attachment strips, and by providing a clamping piece for securement of the object.

According to a further embodiment of the invention, the base strips are configured on both sides with the half-dovetail profile.

It is also provided in accordance with the present invention, that the fastening screws are inclined relative to the vertical.

The afore-stated task is attained in a device for tactile measurement of an object across several axes by providing base strips which are secureable in the measuring plane and configured laterally as a half-dovetail profile, by providing attachment plates to complement the base strips, whereby the attachment plates are provided with a groove and have a hole pattern, and by associating fastening screws to the groove, wherein the base strips and the attachment plates are so sized and arranged to the measuring table that the plane of the measuring table serves as reference plane for the underside of the attachment plates, and by providing a clamping piece for securement of the object.

The advantages realized by the invention reside, in particular, in a safe but also rapid securement of the object to be measured on the measuring table, even if the latter is mobile.

BRIEF DESCRIPTION OF THE DRAWING

The invention will be described in more detail with reference to the drawing.

An exemplified embodiment for the application of a contactless optical measurement is shown in FIG. 1 by way of a perspective illustration of a base strip with mounted attachment strip, FIG. 2 by way of a section of both these strips, and FIG. 3 by way of an illustration of a measuring table with different base and attachment strips as well as an object to be measured and a clamping piece.

Another exemplified embodiment for tactile measurement is shown in

Figure 1:
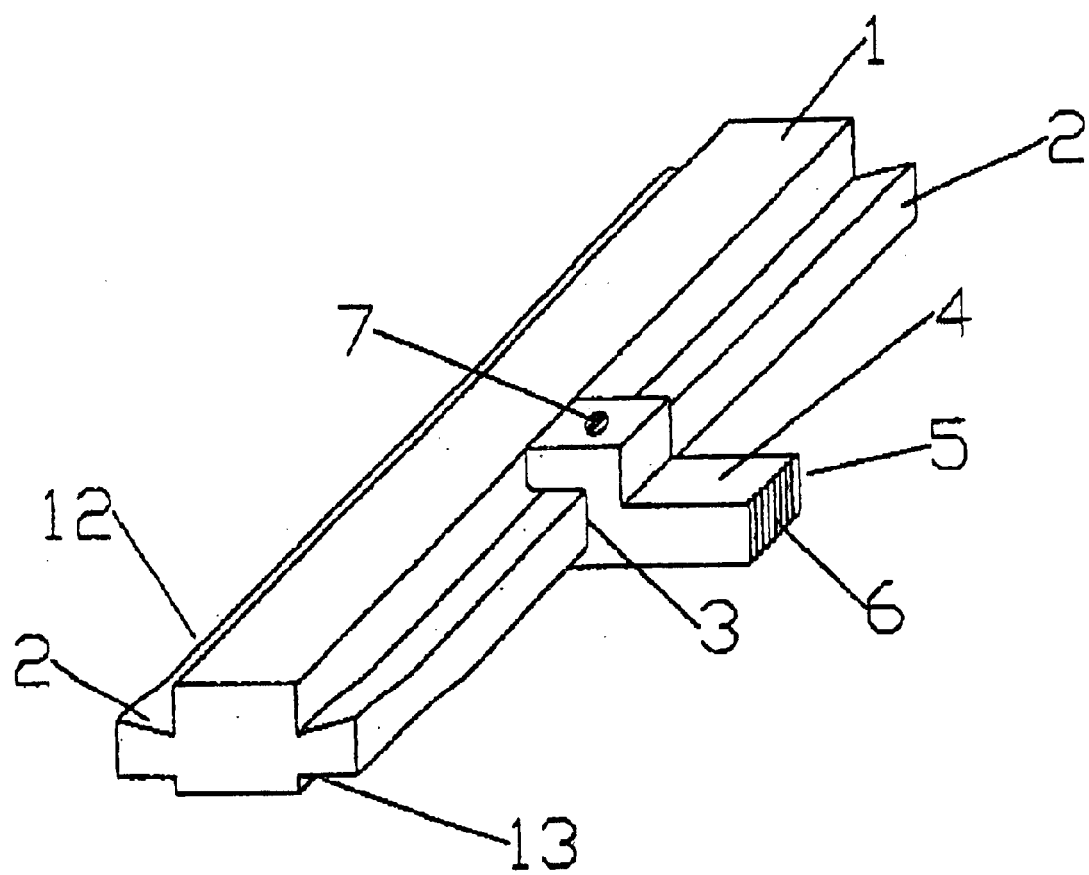
Figure 1A:
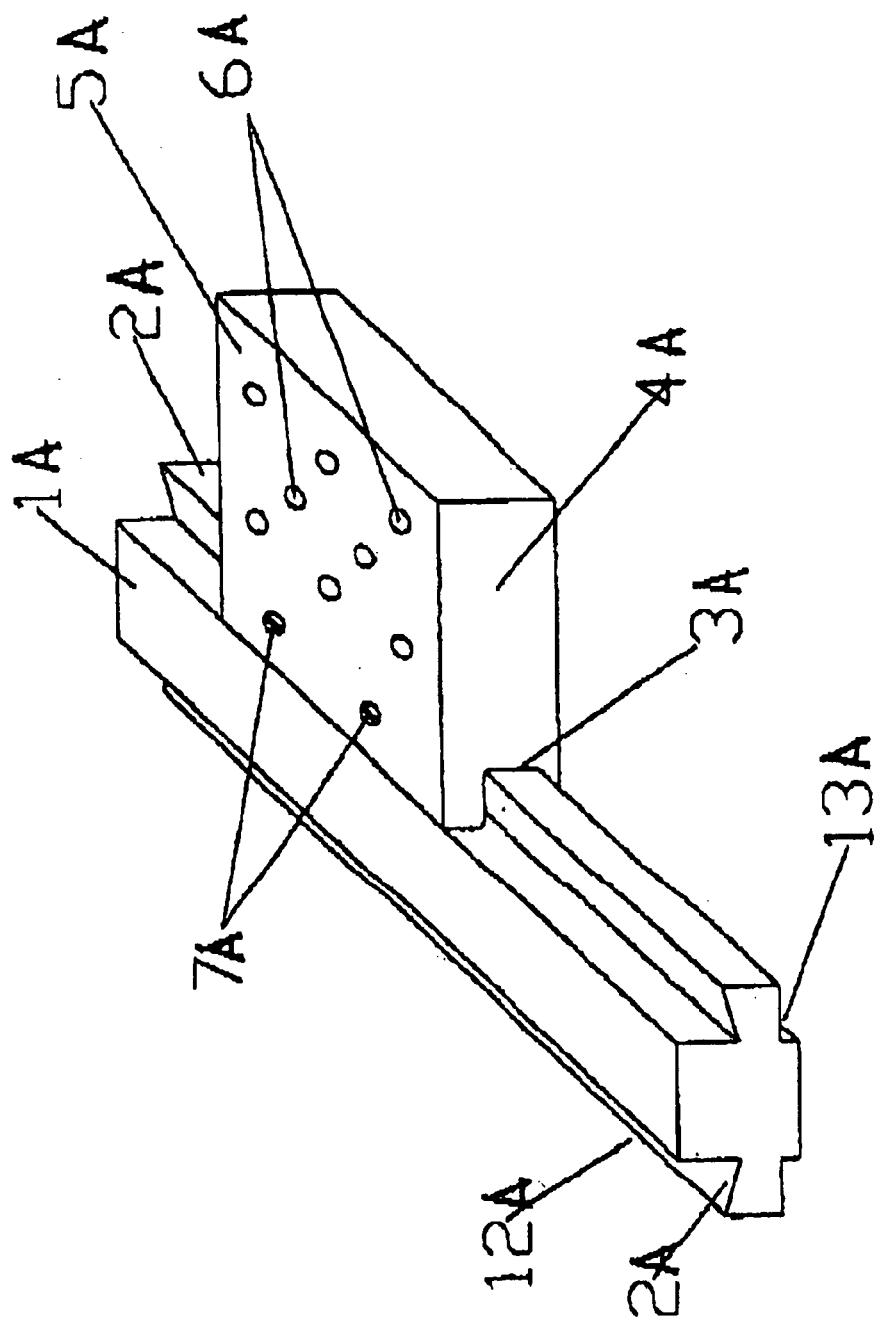
Figure 2:
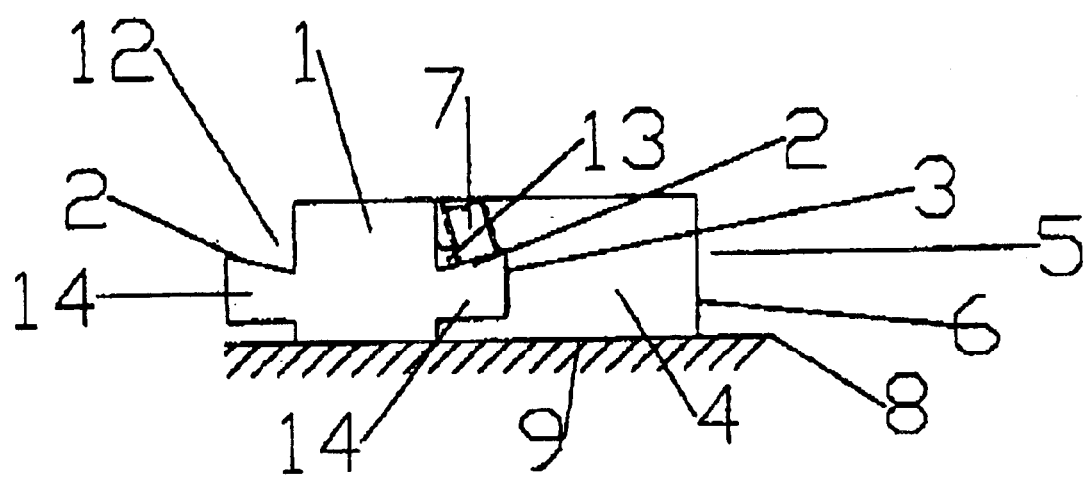
Figure 2A:
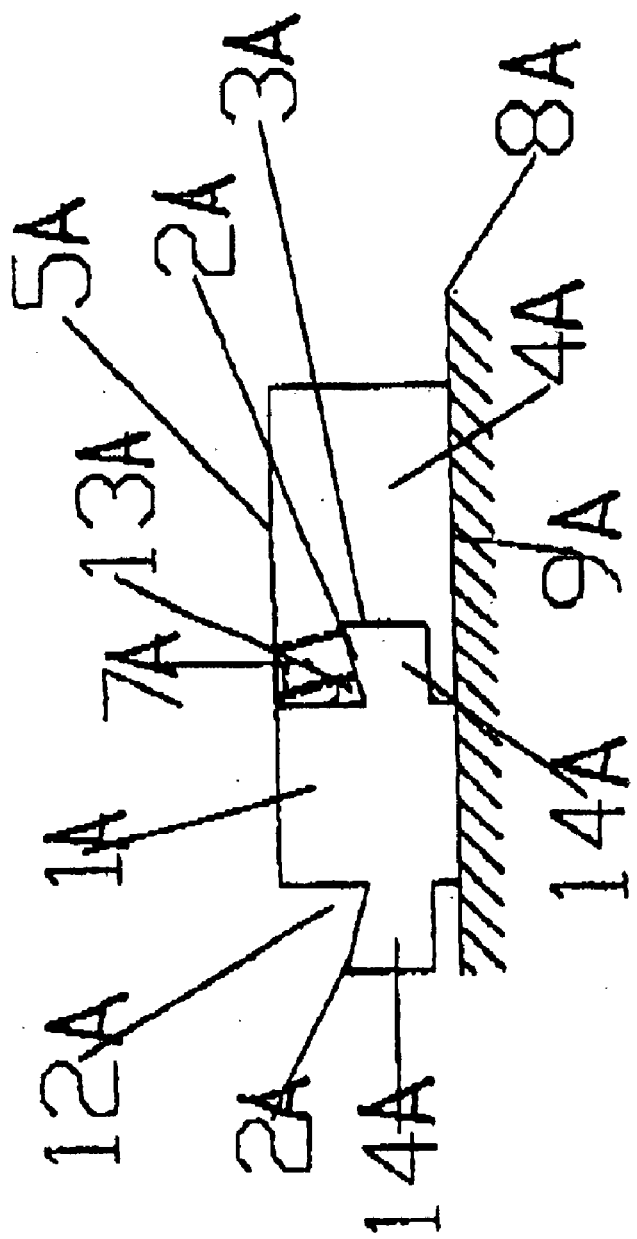
Figure 3:
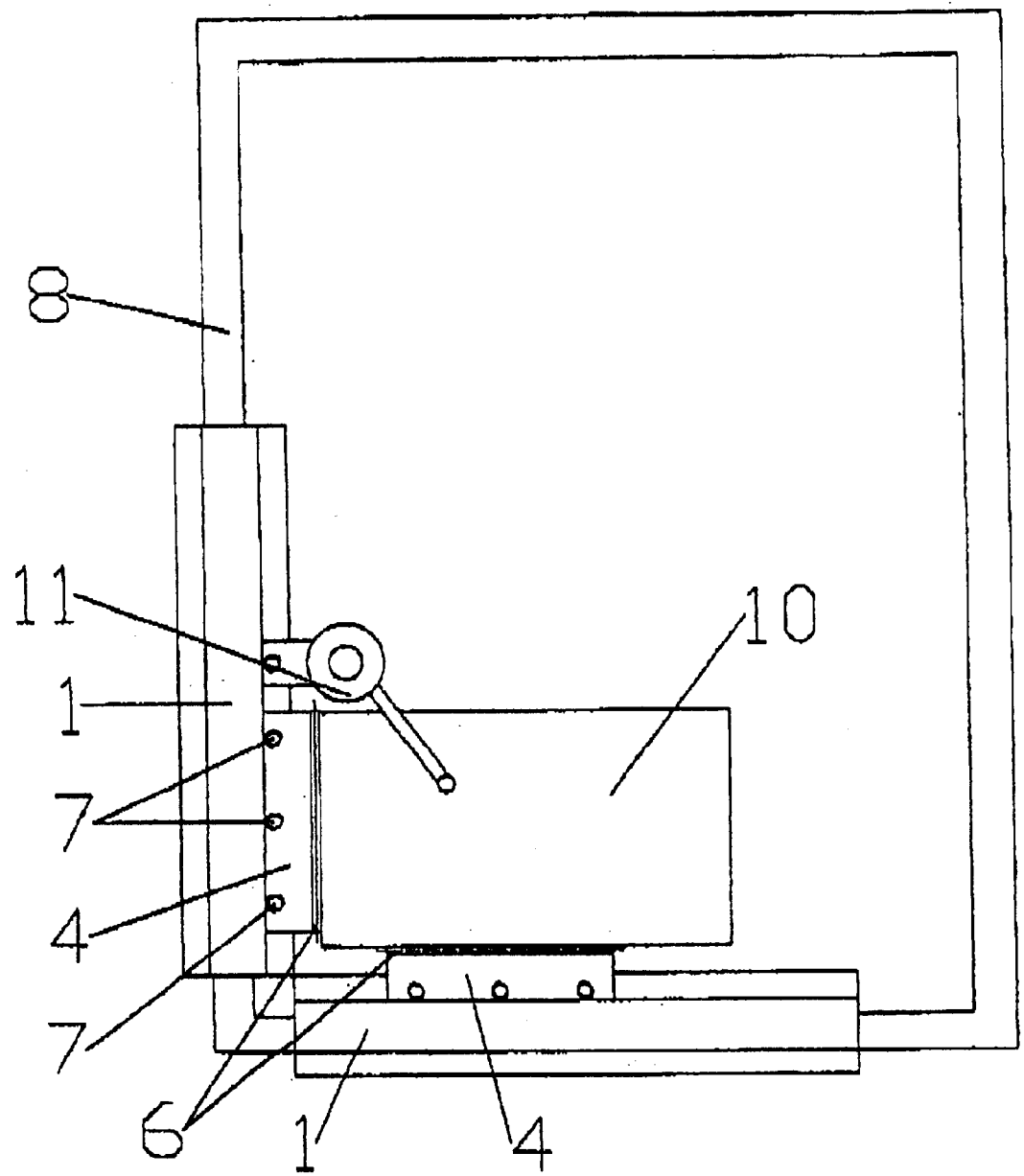
Figure 3A:
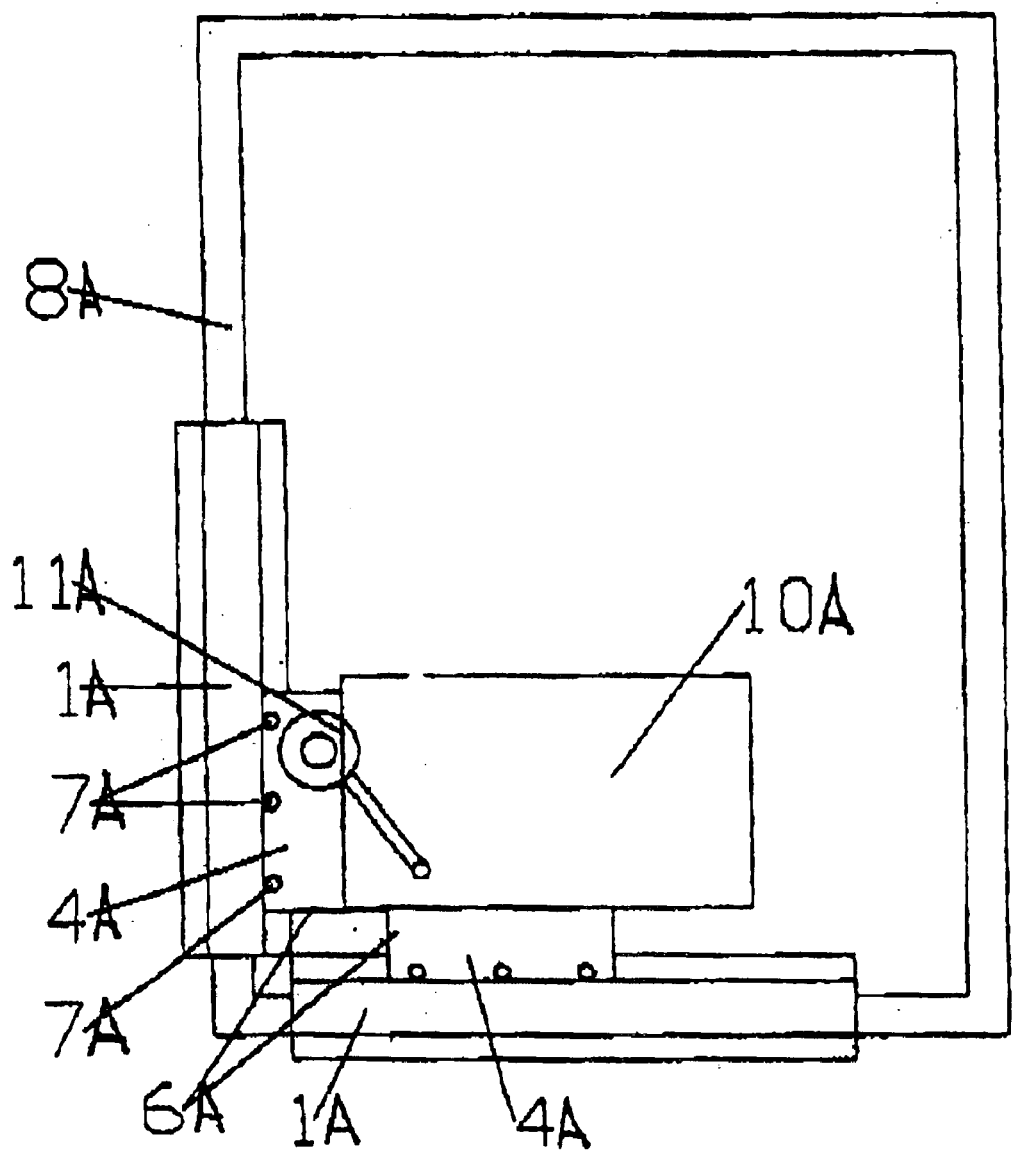

FIG. 1A by way of a perspective illustration of a base strip with mounted attachment plate, FIG. 2A by way of a section of both these strips, and FIG. 3A by way of an illustration of a measuring table with different base and attachment plates as well as an object to be measured and a clamping piece.

DETAILED DESCRIPTION OF PREFERRED EMBODIMENT

The principle according to the invention of base strips 1 and complementary attachment strips 4 will be apparent with reference to FIGS. 1 and 2. The base strips 1 are configured on one side, preferably on both sides 12 and 13 with a half-dovetail profile 2. This means, the tongue 14 of the base strips 1 is slanted only on its top side. The attachment strips 4 have a groove 3 which conforms to the half-dovetail profile 2. The attachment strip 4 has a toothed profile 6 on one side 5 for implementing the contactless optical measurement. Connection of the attachment strips 4 to the base strips 1 is realized by fastening screws 7 which are inclined relative to the vertical so that an optimum clamping upon the top side of the tongue 14 is possible.

The base strips 1 and the attachment strips 4 are so sized and arranged to the measuring table 8 that the plane of the measuring table 8 serves as reference plane for the underside 9 of the attachment strips 4. As a consequence, the plane of the measuring table 8 provides effectively a guide for the attachment strips 4 when approaching the base strips 1, as the attachment strips 4 are joined together with the base strips 1, so that a quick and safe assembly of the measuring site is possible.

8 designates in FIG. 3 the mobile measuring table. 1 denotes base strips for securement of attachment strips 4 by means of fastening screws 7, 10 denotes an object to be measured which is pressed by means of a clamping piece 11 against two toothed attachment strips 4. As a result, unlike the conventional solutions (with kneading mass), a secure mounting of an object 10 to be measured is realized on the moveable measuring table, even for high measuring speeds and accompanying great acceleration forces.

The invention is applicable for all devices of the afore-stated type, regardless whether measurement is intended across two axes or three-dimensional.

The principle according to the invention of base strips 1A and complementary attachment plates 4A will be apparent with reference to FIGS. 1A and 2A for tactile measurement. The base strips 1A are configured on one side, preferably on both sides 12A and 13A, as a half-dovetail profile 2A. This means, the tongue 14A of the base strips 1A is slanted only on its top side. The attachment plates 4A have a groove 3A which conforms to the half-dovetail profile 2A. The attachment plate 4A has a hole pattern 6A on the top side 5A for receiving the workpieces to be measured. Connection of the attachment plates 4A to the base strips 1A is realized by fastening screws 7A which are inclined relative to the vertical so that an optimum clamping upon the top side of the tongue 14A is possible.

The base strips 1A and the attachment plates 4A are so sized and arranged to the measuring table 8A that the plane of the measuring table 8A serves as reference plane for the underside 9A of the attachment plates 4A. As a consequence, the plane of the measuring table 8A provides effectively a guide for the attachment strips 4A when approaching the base strips 1A, as the attachment plates 4A are joined together with the base strips 1A, so that a quick and safe assembly of the measuring site is possible.

8A designates in FIG. 3A the mobile measuring table. 1A denotes base strips for securement of attachment plates 4A by means of fastening screws 7A. 10A denotes an object to be measured which is pressed by means of a clamping piece 11A against two attachment plates 4A. As a result, unlike the conventional solutions, a secure mounting of an object 10A to be measured is realized on the measuring table 8A. The clamping piece 11A is fixed (screwed in) in one of the bores of the hole pattern 6A.

What is claimed is:

1. Device for contactless optical measurement of an object across several axes, comprising base strips (1), which are secureable in a measuring plane and configured laterally as half-dovetail profile (2), attachment strips (4), which complement the base strips and are provided with a groove (3) and which have a toothed profile on one side (5), a moveable, optically transparent measuring table (8) for placement of the object, fastening screws (7), which are associated to the groove (3), wherein the attachment strips (4) are directly placed upon the measuring table (8) so that the plane of the measuring table (8) serves as reference plane for the underside (9) of the attachment strips (4), and a clamping piece (11) for securement of the object (10) on the measuring table against the attachment strips.

2. The device of claim 1, wherein the base strips (1) have on two sides (12, 13) the half-dovetail profile (2).

3. The device of claim 1, wherein the fastening screws (7) are inclined relative to the vertical.

4. Device for contactless optical measurement of an object across several axes, comprising base strips (1A), which are secureable in a measuring plane and configured laterally as half-dovetail profile (2A), attachment plates (4A), which complement the base strips and are provided with a groove (3A) and which have a hole pattern (6A) on the top side (5A), when used for tactile measurement, a moveable, optically transparent measuring table (8) for placement of the object, fastening screws (7A), which are associated to the groove (3A), wherein the attachment plates (4) are directly placed upon the measuring table (8A) so that the plane of the measuring table (8A) serves as reference plane for the underside (9A) of the attachment plates (4), and a clamping piece (11A) for securement of the object (10A) on the measuring table against the attachment plates.

5. The device of claim 4, wherein the base strips (1) have on two sides (12A, 13A) the half-dovetail profile (2A).

6. The device of claim 4, wherein the fastening screws (7A) are inclined relative to the vertical.

7. A device for contactless, optical measurement of an object in fixed position for subsequent measurement, comprising:

a transparent measuring table for placement of an object to be measured;

a base member constructed for securement to the measuring table, said base member having a tongue projecting out laterally from the base member and having a side extending at an inclination of less than 90°;

an attachment member provided with a groove, having a configuration to complement the tongue, for attachment of the attachment member to the tongue of the base strip, said attachment member being placed directly on the measuring table so that the measuring table defines a reference plane for an underside of the attachment member;

fastening screws for securely fixing the attachment member to the base member; and a clamping piece for securing the object on the measuring table against the attachment member.

8. The device of claim 7, wherein the attachment member has a groove-distal side formed with a toothed profile for contactless optical measurement.

9. The device of claim 7, wherein the attachment member has a top side formed with a hole pattern for tactile measurement.

10. The device of claim 7, wherein the base member has a further such tongue projecting out from an opposite side of the base member.

11. The device of claim 7, wherein the fastening screws are inclined relative to a vertical.

* * * * *